United States Patent
Thulasi et al.

(10) Patent No.: US 11,281,476 B2
(45) Date of Patent: Mar. 22, 2022

(54) PLUGIN FRAMEWORK TO SUPPORT ZERO TOUCH MANAGEMENT OF HETEROGENEOUS INFRASTRUCTURE ELEMENTS ACROSS DISTRIBUTED DATA CENTERS

(71) Applicant: Hewlett Packard Enterprise Development LP, Houston, TX (US)

(72) Inventors: Arun Thulasi, San Jose, CA (US); Jonas Arndt, Ft. Collins, CO (US); Philip Martin Halstead, Bracknell (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/777,779

(22) Filed: Jan. 30, 2020

(65) Prior Publication Data

US 2021/0240497 A1   Aug. 5, 2021

(51) Int. Cl.
*G06F 3/00* (2006.01)
*G06F 9/445* (2018.01)
(Continued)

(52) U.S. Cl.
CPC .......... *G06F 9/44526* (2013.01); *G06F 9/541* (2013.01); *G06F 9/542* (2013.01); *G06F 9/546* (2013.01); *G06F 13/20* (2013.01)

(58) Field of Classification Search
CPC .............................. G06F 9/54; G06F 9/44526
(Continued)

(56) References Cited

U.S. PATENT DOCUMENTS 9,197,709 B2   11/2015   Caputo, II et al.
9,936,005 B1*   4/2018   Palladino ................ H04L 67/28
(Continued)

OTHER PUBLICATIONS

Simon Caton, Social Compute Cloud: Allocating and Sharing Infrastructure Resources via Social Networks. (Year: 2014).*
(Continued)

*Primary Examiner* — Lechi Truong
(74) *Attorney, Agent, or Firm* — Jaffery Watson Mendonsa & Hamilton

(57) ABSTRACT

Example implementations relate to a plugin framework that facilitates management of heterogenous infrastructure resources residing in distributed data centers by multiple resource aggregators (RAs). According to an example, the plugin framework is logically interposed between the RAs and the heterogeneous infrastructure resources. The plugin framework includes multiple plugins each of which exposes a public API through which the RAs interact with the heterogeneous infrastructure resources. Each of the plugins corresponds to a particular type of resource of the heterogeneous infrastructure resources. Responsive to a first request issued to an RA by a north-bound client to a collection of the heterogeneous infrastructure resources, a plugin receives via its public API a second request including an RA-native message directed to a resource of the collection. The plugin directs the resource to take an action specified by the second request by translating the RA-native message to an infrastructure-native message understood by the resource.

20 Claims, 7 Drawing Sheets

(51) Int. Cl.
*G06F 13/20* (2006.01)
*G06F 9/54* (2006.01)

(58) Field of Classification Search
USPC .......................................................... 719/328
See application file for complete search history.

(56) References Cited

U.S. PATENT DOCUMENTS

| | | | |
|---|---|---|---|
| 10,324,771 B1 | 6/2019 | Iyangar et al. | |
| 10,534,566 B1* | 1/2020 | Bk | G06F 3/061 |
| 10,915,378 B1* | 2/2021 | Mary | G06F 9/44526 |
| 2008/0049022 A1* | 2/2008 | Sherb | G06Q 10/06 |
| | | | 345/440 |
| 2008/0219429 A1* | 9/2008 | Mandalia | H04M 3/5175 |
| | | | 379/266.02 |
| 2012/0047501 A1 | 2/2012 | Box et al. | |
| 2013/0185413 A1* | 7/2013 | Beaty | H04L 43/0876 |
| | | | 709/224 |
| 2016/0239062 A1* | 8/2016 | Lee | G09G 5/10 |
| 2017/0289307 A1 | 10/2017 | Thompson et al. | |
| 2017/0371759 A1* | 12/2017 | Allaire | G06F 11/3006 |
| 2018/0089005 A1 | 3/2018 | Green et al. | |
| 2019/0102411 A1* | 4/2019 | Hung | H04L 41/0856 |

OTHER PUBLICATIONS

Yu-Pin Ma, Combine BIM-Based and Mobile Technologies to Design On-Site Support System for the Communication and Management of Architectural Heritage Conservation Works. (Year: 2017).*

Premek Brada, Ensuring Component Application Consistency on Small Devices: A Repository-Based Approach. (Year: 2012).*

Ericsson, "Prepare for zero-touch: 3 network automation benefits", available online at <https://www.ericsson.com/en/blog/2019/6/prepare-for-zero-touch-3-network-automation-benefits>, 1994, 6 pages.

Etsi, "Zero touch network & Service Management (ZSM)", available online at <tsi.org/technologies/zero-touch-network-service-management?jjj=1587367073084>, retrieved on Apr. 20, 2020, 8 pages.

Github, "Open Messaging Specification", available online at <https://github.com/openmessaging/specification>, Mar. 1, 2019, 3 pages.

Github, "OpenAPI Specification", Version 3.0.0, available online at <https://github.com/OAI/OpenAPI-Specification/blob/OpenAPI.next/versions/3.0.0.md>, Jul. 26, 2017, 85 pages.

Redfish, "Redfish Scalable Platforms Management API Specification", DMTF, Version: 1.6.1, available online at <http://redfish.dmtf.org/schemas/DSP0266_1.6.1.html>, Dec. 13, 2018, 69 pages.

REST API Tutorial, "HATEOAS Driven REST APIs", available online at <https://restfulapi.net/hateoas/>, retrieved on Apr. 20, 2020, 15 pages.

Swagger, "Swagger UI", SmartBear Software, available online at <https://swagger.io/tools/swagger-ui/>, 2019, 4 pages.

Wikipedia, "Camel case", available online at <https://en.wikipedia.org/w/index.php?title=Camel_case&oldid=868043687>, Nov. 9, 2018, 10 pages.

Intel Corporation, "Retrieving Redfish* Platform Telemetry," Feature Brief, 2019, pp. 1-2.

* cited by examiner

US 11,281,476 B2

PLUGIN FRAMEWORK TO SUPPORT ZERO TOUCH MANAGEMENT OF HETEROGENEOUS INFRASTRUCTURE ELEMENTS ACROSS DISTRIBUTED DATA CENTERS

BACKGROUND

Organizations benefit from data centers in a variety of ways. For example, the use of data centers allow companies to focus on the objectives of their respective consumers instead of technological maintenance. The use of a data center ensures the continuity of a business' Information Technology (IT) infrastructure. For example, by contracting the services of a data center to host IT infrastructure a business can ensure that critical services are not significantly impacted due to local power or Internet outages. For these and other reasons, data centers have become the powerhouses of the industrial world.

There are numerous challenges, however, associated with managing modern data centers. Today's data centers are complex, virtualized, and distributed across multiple geographies. Data centers are becoming increasingly distributed with Zero Touch Provisioning (ZTP) considered table stakes and Zero Touch Management (ZTM) an aspirational goal. While data centers that employ a multi-vendor strategy may be able to achieve reduced upfront costs and avoid vendor lock-in, deploying multi-vendor equipment creates additional complexity in relation to managing the diverse infrastructure. Another issue relates to scalability, for example, in relation to handling of synchronous events received from the resources.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
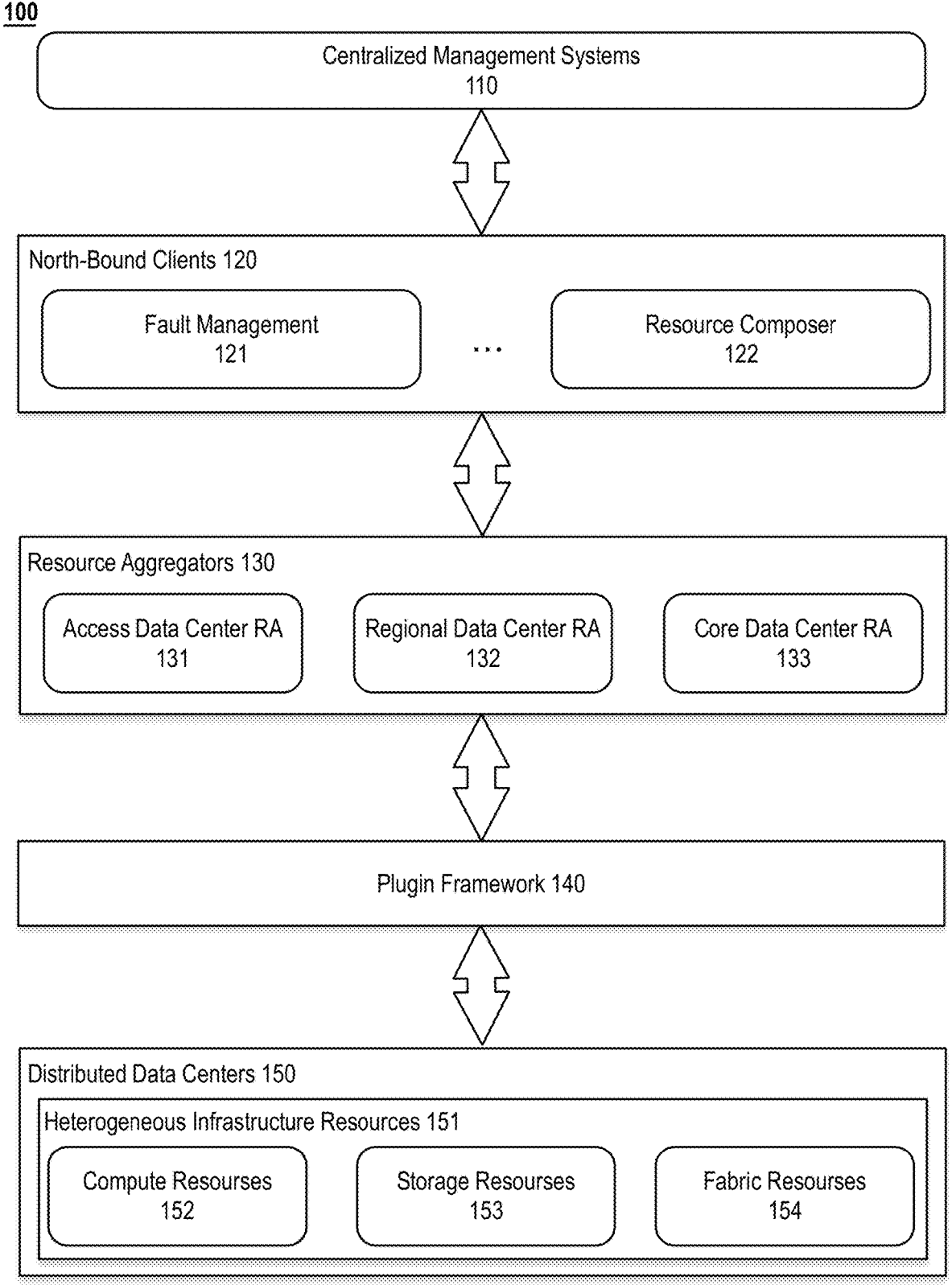
FIG. 1 is a block diagram conceptually illustrating entities and components involved in example resource aggregator use cases in accordance with an embodiment.

Embodiments described herein are generally directed to a plugin framework that facilitates management of geographically distributed, multi-vendor infrastructure by a plurality of resource aggregators. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

As noted above, there are numerous challenges associated with managing modern distributed data centers having multi-vendor equipment. While not limited to telecommunications service providers, embodiments described herein, address various issues resulting from the evolution of modern telcom networks to 5G and edge computing, which has resulted in IT compute, storage and network infrastructure from multiple vendors being deployed across potentially thousands of geographically distributed and diverse points of presence, including central offices, cell tower huts, wiring closets as well as traditional data centers. Existing data center infrastructure management solutions originate from the enterprise, are monolithic, closed, sometimes embedded and do not scale to support massively distributed data centers as are now becoming prevalent in telecom and other networks. These existing monolithic, vendor-specific and siloed management approaches have become too cumbersome and limiting in today's environment of increased workload distribution, which have created a need for hierarchical, open infrastructure management.

Protocols such as Redfish have evolved to address some of the challenges by providing a standard Application Programming Interface (API) that simplifies management of Information Technology (IT) assets, however, efficiently managing event and telemetry data subscriptions for applications like monitoring systems and handling credential management are complex to set up across all resources in a data center due to the number of disparate management protocols in use today. Operations and event management as well as the gathering of telemetry data also increase in complexity in proportion to the number of compute, storage and networking components deployed. Furthermore, efficiently achieving these capabilities for geographically distributed, multi-vendor infrastructure scaling to thousands of components requires aggregation of those resources into collections so that a north-bound client can perform operations (e.g., fault management, resource composition, firmware upgrades, system resets, monitoring and event subscription, credential management, telemetry and so forth) for a collection of tens, hundreds or thousands of components.

Embodiments described herein extend the capabilities of RAs to allow any infrastructure management system capable of supporting Redfish-based subscription and composition functions, for example, to subscribe to events and perform operations on an aggregated view of compute, storage and data center fabrics exposed via a Redfish-based API and associated Redfish Data model. This abstracts the complexity of infrastructure management systems communicating directly with heterogeneous hardware elements and their associated vendor-specific fault and configuration management protocols and configuration models.

In various embodiments, functional separation creates a scalable fault and configuration management hierarchy by allowing fault and infrastructure lifecycle management functions to be deployed "centrally" and thereby manage infrastructure across multiple data centers though communications with one or more distributed RA instances. For example, validated north-bound clients can monitor, add, edit, search with filters and remove infrastructure through a Redfish API call to one or more RA instances, each of which mediate communication with the resources for which it provides manageability. In embodiments described herein, the RAs are off-platform from the infrastructure they manage, hence they can pool resource information across multiple racks and/or data centers.

As described in further detail below, in one embodiment, a distributed plugin framework logically interposed between the RA instances and the infrastructure resources serves two main functions. For example, the plugin framework allows for configuration operations of infrastructure through a public API (e.g., a Representational State Transfer (REST) or Simple Object Access Protocol (SOAP) based control API) and provides an Event Message Bus (EMB) that is used to mediate event, notifications and telemetry data. In one embodiment the plugin framework includes a diverse set of plugins (or drivers) that have the capability to interact natively with the underlying resource by translating a request received via a public API (e.g., an open standard API request) into a request that the resource can understand in the form of an infrastructure-native message in a native protocol supported by the resource. Similarly, the plugins support the reverse path from the resources to the north-bound clients via the API of the RA by translating responses (e.g., acknowledgements) from the resources in the form of infrastructure-native messages to corresponding RA-native messages.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The term "plugin" generally refers to a software module that performs translation between resource aggregator (RA)-native messages and infrastructure-native messages. For example, assuming an RA implements a Redfish API, in response to a request received by the RA via the Redfish API from a north-bound client, a plugin may be invoked by the RA by passing the Redfish message as a payload to the plugin's API server to translate the Redfish message expressed in JavaScript Object Notation (JSON) to a vendor-specific mechanism for a particular type of infrastructure resource to perform an operation on the infrastructure resource. Similarly, when a plugin receives a response from an infrastructure resource in an infrastructure resource-native format, the plugin responds to the resource aggregator with a Redfish payload. In one embodiment, plugins are independent modules associated with a plugin layer of a distributed plugin framework that each provide two primary communication channels—an API mechanism that is used to exchange control data and an Event Message Bus (EMB) that is used to exchange event, notifications and telemetry data. Plugins may be developed and distributed by IT equipment vendors. Documentation associated with a particular plugin should provide access to the source code and build/deploy instructions on the source repository or development platform (e.g., GitHub). In this manner, deployers may utilize this information to deploy resource aggregators and their respective components within their existing framework as a virtual machine, a container or a bare-metal service. The individual services used by a plugin (e.g., API server) should also be part of the build instructions provided by the plugin.

As used herein "plugin framework" means a software framework or platform within which plugins may be deployed. According to various embodiments described herein, a plugin framework provides infrastructure abstraction and/or event handling. Depending upon the particular embodiment, the plugin framework may include predefined classes and functions that can be used to process input and interact with other components of the plugin framework.

As used herein "public API" means a publicly available application programming interface. Public APIs are typically published on the Internet and shared freely. Public APIs are often referred to as open APIs. A public API may provide developers with programmatic access to a proprietary software application or web service. A non-limiting example of a public API is an open industry standard specification API.

As used herein a "north-bound interface" of a component of a network or computer architecture generally refers to an interface that allows the component to communication with a higher-level component, using the latter component's south-bound interface (i.e., an interface that allows a particular network component to communication with a lower-level component). The north-bound interface typically conceptualizes or abstracts the lover level details (e.g., data or functions) used by, or in the component, allowing the component to interface with higher level layers.

As used herein a "north-bound client" generally refers to a higher-level component that communicates with a lower level component via its south-bound interface.

The phrase "resource aggregator" or the acronym "RA" generally refers to an off-platform system that facilitates interaction with a collection of infrastructure resources. In embodiments described herein a resource aggregator may be used by a centralized management system of an enterprise to perform operations on collections of infrastructure resources via various north-bound clients (e.g., fault management systems, resource composers, orchestrators, management solutions, monitoring services, data analytics services, and the like). In embodiments described herein the infrastructure resources may include heterogeneous infrastructure resources that are of different types and/or manufactured or distributed by different vendors. A resource aggregator may provide a unified public API (e.g., an open industry standard specification API) encompassing multiple types of infrastructure resources through which the heterogeneous infrastructure resources can be managed. In this manner, a resource aggregator hides the details of vendor-specific messaging and protocols from the north-bound clients. As described further below, in embodiments described herein, resource aggregators make use of a plugin framework to provide infrastructure abstraction and event handling. A non-limiting examples of a resource aggregator, but limited to aggregation of heterogeneous infrastructure resources of a single vendor, is Hewlett Packard Enterprise's Integrated Lights Out (iLO) amplifier, which includes iLO server management software that enables configuration, monitoring and updating of Gen8, Gen9 and Gen 10 HPE servers.

As used herein "heterogeneous infrastructure resources" means multiple infrastructure resources commonly found in data centers that are of different types and/or manufactured or distributed by different vendors. Non-limiting examples of types of infrastructure resources include compute infrastructure elements (e.g., processors, processor cores, computer systems, rack mount servers, and the like), storage infrastructure elements (e.g., storage systems and storage networking technologies, such as storage area networks (SAN), network attached storage (NAS), redundant array of independent disks (RAID) and the like), network infrastructure (e.g., telecommunications systems, domain name system (DNS) servers, email servers, proxy servers, network security devices (e.g., firewalls, virtual private networking (VPN) gateways, intrusion detection systems and the like), gateway systems, routers, switches, and the like) and fabric infrastructure elements (e.g., switches).

FIG. 1 is a block diagram conceptually illustrating entities and components involved in example resource aggregator use cases in accordance with an embodiment. In the context of the present example, centralized management systems 110 employed by an enterprise (e.g., a telecommunications service provider, an Internet service provider, a government agency, a financial institution, a retailer, or the like) make use of intermediate north-bound clients 120 to perform operations on collections of heterogeneous infrastructure resources 151 physically residing in distributed data centers 150. In the context of a telecommunications service provider, for example, the distributed data centers 150 may be organized hierarchically with access, edge, regional and core data centers or edge data centers with the data centers located geographically in appropriate numbers to achieve desired latency.

In the context of the present example, the north-bound clients 120 (e.g., fault management system 121 and resource composer 122) issue their requests directed to collections of infrastructure resources of the heterogeneous infrastructure resources 151 and receive feedback (e.g., acknowledgements) regarding their requests via resource aggregators 130. For example, an administrator may perform centralized fault management facilitated by event aggregation (e.g., aggregation of compute, storage and networking events). Furthermore, an administrator may perform uniform event management across multiple protocol sets with the ability to subscribe to events. Similarly, resource composer 122 may provide the administrator with the ability to perform centralized resource composition independent of the vendor of the particular resources, including adding/editing/removing/ searching the heterogeneous infrastructure resources 151, exposing new fabrics and establishing basic host-to-host communications.

The resource aggregators 130 may be organized hierarchically to reflect the hierarchical nature of the distributed data centers 150. Non-limiting examples of resource aggregators 130 include an access data center resource aggregator 131, which may be deployed within or otherwise manage those of the heterogeneous infrastructure resources 151 associated with an access data center, a regional data center resource aggregator 132, which may be deployed within or otherwise manage those of the heterogeneous infrastructure resources 151 associated with a regional data center, and a core data center resource aggregator 133, which may be deployed within or otherwise manage those of the heterogeneous infrastructure resources 151 associated with a core data center. As described further below, in one embodiment, the resource aggregators 130 may provide a unified public API (e.g., an open industry standard specification API) encompassing multiple types of infrastructure resources from different vendors through which the heterogeneous infrastructure resources 151 can be managed.

According to one embodiment, the resource aggregators 130 interact indirectly with the heterogeneous infrastructure resources 151 via a plugin framework 140 that provides infrastructure abstraction and event handling. Advantageously, in this manner, the resource aggregators 130 are provided with a common interface and are abstracted from the details of vendor-specific messaging and protocols. As described further below, in various embodiments, the plugin framework 140 may provide a public API (e.g., an open industry standard specification API) to connect the end resources within the distributed data centers 150 with the resource aggregators 130 either directly or via a resource specific element or resource manager.

In the present example, the heterogeneous infrastructure resources 151 include compute resources 152, storage resources 153 and fabric resources 154. Depending on the particular enterprise, one or more of the compute resources 152, storage resources 153 and fabric resources 154 may include IT equipment from multiple vendors. For example, an enterprise may deploy rackmount servers, rackmount data storage systems and rackmount switches available from Hewlett Packard Enterprise (HPE) as well as IT equipment from one or more other vendors.

Figure 2:
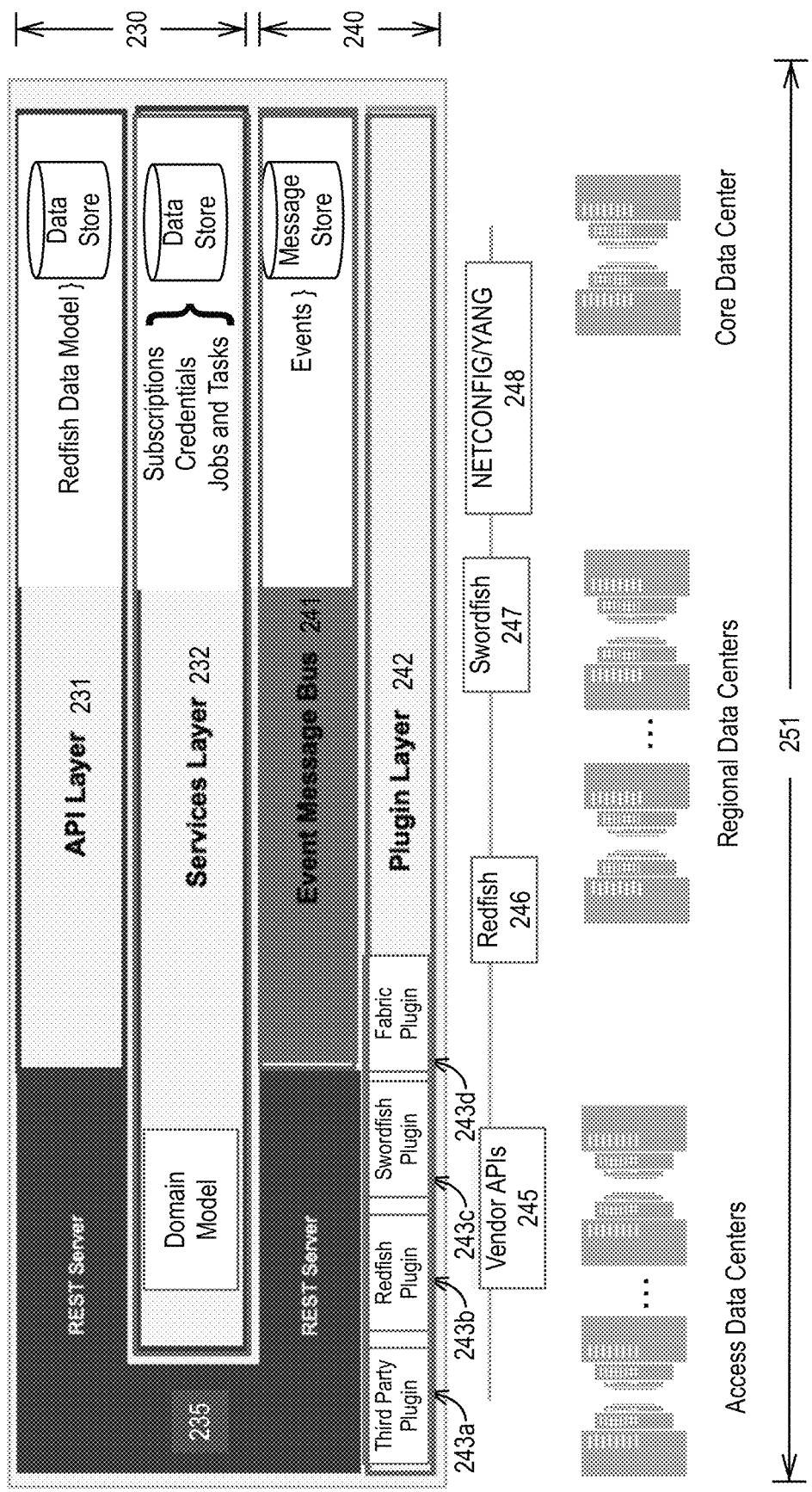
FIG. 2 is a block diagram providing an architecture overview of a resource aggregator and a plugin framework in accordance with an embodiment.

FIG. 2 is a block diagram providing an architecture overview of a resource aggregator 230 and a plugin framework 240 in accordance with an embodiment. In the context of the present example, the resource aggregator 230 includes an API layer 231 and a services layer 232 and the plugin framework 420 includes an Event Message Bus (EMB) 241 and a plugin layer 242. In one embodiment, the API layer 231 is involved in interacting with any north-bound client and also hosts the Redfish aligned models that constitute the payload for these types of interactions. In the context of the present example, north-bound clients are assumed to utilize REST as a protocol, therefore the API layer 231 also hosts a REST server 235.

In one embodiment, the services layer 232 generally represents the logic for organizing operations, deciding what plugin will be used, serializing operations on collections and so on. The services layer 232 may also host other the services (e.g., an aggregation service, an event service, plugin service(s), an account service, a session service, and a task service) described herein.

The Plugin Layer

The plugin layer 242 forms the south-bound connector end of a resource aggregator (e.g., resource aggregator 230). The plugin layer 242 abstracts the vendor specifics (e.g., use of vendor APIs 245), and access protocols (e.g., Redfish 246, Swordfish 247 and/or NETCONFIG/YANG 248), thereby allowing the resource aggregator to communicate with the infrastructure resources using a common interface provided by the plugin layer 242. The plugin layer 242 is also responsible for getting responses to requests and other notifications (e.g., events to be exposed to fault management systems) from the infrastructure resources on behalf of the resource aggregator.

The plugin layer 242 represents a framework for use by plugin developers. In one embodiment, plugins (e.g., third-party plugin 243a, Redfish plugin 243b, Swordfish plugin 243c, and fabric plugin 243d) within the plugin layer 242 use the EMB 241 and REST to communicate with the services layer 232 to increase flexibility for plugin developers and to avoid dependency on specific languages.

According to one embodiment, the plugin layer 242 is a polyglot to support plugins developed in any programming language and support the message bus of choice and the REST calls (e.g., as put forward by the Redfish specification). In this manner, third-party developers may create plugins on any toolset of their choice without enforcing any strict language binding.

In one embodiment, in support of polyglotism and for purposes of being decoupled from the services layer 232, the plugin layer 242 utilizes a message queue/stream to publish and subscribe to messages for events. As described further below, as most API-related interactions with the plugin layer 242 are expected to be carried out utilizing REST-based communication, all plugins (e.g., plugins 243a-d) should implement a REST server and a REST client.

In one embodiment, each plugin (e.g., plugins 243a-d) supports at least a set of predefined methods (e.g., for adding infrastructure resources, setting a certain type of notification, etc.). Depending upon the particular implementation, these predefined methods may be considered mandatory methods. The resource aggregator and the plugin may also agree upon additional optional methods for specific resource(s) and/or use case(s).

Plugin Startup

As part of the start-up procedure, in accordance with an embodiment, the plugins 243a-d and the resource aggregator 230 execute a handshake to share state information for the plugins 243a-d to perform setup processing. For example, this may include information relating to sessions that are currently setup for the plugin to verify and setup if needed. Further discussion regarding plugin startup processing is provided below with reference to FIG. 4.

Plugin Choice

According to one embodiment, when a new infrastructure resource is added to the resources 351 or to a collection (subset) of the resources 351 to be associated with a particular plugin a choice can be made regarding the plugin to be associated with the new infrastructure resource. For example, during an add infrastructure operation (e.g., an HTTP or HTTPS POST to an add action of the aggregation service) a plugin may be specified to be used for communications with the infrastructure resource in addition to an IP address of the infrastructure resource and credentials. In other embodiments, the plugin choice can be specified in the configuration file for certain resource types or determined based on notifications provided by a certain plugin on self-discovery. In some embodiments, during the add infrastructure operation, if the resource aggregator 230 does not know which plugin 243a-d might be the best choice to be used for a certain resource, it could direct the plugins 243a-d to perform a certain operation and choose which one to use based on the return messages from the plugins 243a-d. After the appropriate plugin 243a-d has been identified, the resource aggregator 230 may tag the identified plugin as the preferred plugin for future interactions with that resource.

In certain embodiments, a plugin may discover that one or several resources have been added to the heterogeneous infrastructure resources 241. Responsive to such discovery, the plugin may put this information on the event message bus 241 in the form of an event to generate a real event in the event service (e.g., a Redfish Event service). In this manner, north-bound clients (e.g., orchestrators and composers) can subscribe to these events and use the information to add the resources to a centralized management system (e.g., centralized management system 110) or the like.

In one embodiment, the resources aggregator's handshake mechanism or the plugin's discovery mechanism may match a group of the heterogeneous infrastructure resources 251 to a certain plugin (which may be referred to hereafter as the resource-plugin mapping). While in the context of embodiments described herein, plugins are described as mapping to infrastructure resources of a particular type with one plugin interacting with a particular resource or resource type, as functionalities evolve and management platforms mature, the resource aggregator 230 may have a function-plugin mapping where a certain function may be tied to a plugin across multiple resource types. This would allow multiple plugins to work on the same resource.

Event Processing

One of the functions of the plugin layer 242 in accordance with various embodiments described herein is to assist with notification processing. As will be appreciated by those skilled in the art infrastructure resources can be setup to provide synchronous notifications (e.g., a health report every 5 minutes) or asynchronous notifications (e.g., the failure of a critical component). Resources may support reporting notifications by various means (e.g., RESTful notifications, message based notifications, syslog notifications, Simple Network Management Protocol (SNMP) notifications and the like). In one embodiment, the resources can rely on corresponding plugins to translate their respective notifications into an event (e.g., a Redfish event) and pass it on the event message bus 241. For example, the notifications may be passed on from the plugin to the resource aggregator 230 via the event message bus 241 with the actual message available as part of the payload. Depending upon the particular implementation, this may include receiving non-standard responses such as SNMP, log files and other forms of notifications that would have to be converted by the plugin into an RA-native event format (e.g., a Redfish Event format).

For resources that cannot meet the requirements set by the resource aggregator 230 for notifications (e.g., synchronous notifications), the plugin layer 242 may provide a mechanism to synchronize responses back to the resource aggregator 230 by providing the responses in a pre-agreed format (e.g., Redfish). In this scenario, the plugin layer 242 may provide a collector to receive the non-standardized responses from the devices before converting them to the pre-agreed standard and sending them to the resource aggregator 230. A non-limiting example of use of such a collector includes running an SNMP collector to process SNMP notifications from a particular resource. Meanwhile, the plugin layer 242 may provide a way to convert non-standardized messages from various plugins into a standardized format.

Plugin Failure

According to one embodiment, the resource aggregator 230 need not maintain a heartbeat to be aware of the plugins; however, if multiple messages are not responded, to by a particular plugin, the resource aggregator 230 may determine that the service has failed and may initiate a restart of the plugin at issue. On failure of a plugin, the resource aggregator 230 may restart the service by following the same procedure as when a service is initially started by exchanging state information for the plugin to setup the resources as part of the handshake. Any requests that were previously sent to the plugin for which responses were not received may be reissued after the completion of the startup process.

Containerization

The plugin layer 242 is expected to communicate with multiple resources at the same time. Plugins 243a-d are also expected to work with servers, for example, that are distributed. According to one embodiment, to achieve horizontal scalability to meet these expectations, plugins 243a-d can schedule individual tasks on distributed servers that will respond back to the messaging cluster. In one embodiment, the individual tasks can be containerized to run on multiple host operating systems while keeping the tasklets themselves lightweight.

As noted above, plugins may be deployed as a virtual machine or container or a bare-metal service. For a containerized version of a plugin, a non-limiting example of the deployment could look as follows.

Artifacts for use by a deployment tool (e.g., a GitHub repo (owned by the plugin developers), a docker file and a Kubernetes YAML file (both owned by the deployer).

In this example, the plugin code and artifacts are available from GitHub. The Dockerfile indicates how to build a containerized image of the plugin and its associated processes. The Kubernetes YAML file indicates how a plugin cluster will be deployed.

The deployer provides an operating environment that uses Kubernetes for cluster management and Docker Containers for virtualization.

The deployer uses the same basic devops principles to deploy the service. The toolkit's input file indicates which modules to deploy and the Kubernetes YAML file triggers the deployment of Docker instances.

Composite Actions and Message Processing

In various embodiments described herein, a single RA-native message is assumed to include actions that can be performed by a single plugin on one or more resources indicated in the payload. This ensures that the plugin-to-resource mapping is preserved. In alternative implementations, a single RA-native message could include composite actions to be performed by more than one plugin on the same resource. In such a scenario, the responsibility of drafting a composite message may reside with the resource aggregator 230 and may involve the resource aggregator 230 posting the composite message asking for a series of tasks to be performed that would then be interpreted by one or more plugins that independently perform the appropriate actions.

Security

According to one embodiment, plugins 243a-d authenticate themselves with the resource aggregator 230 using the available account and session services. For example, a plugin 243a-n may require a user to be available within the account service as part of the administrative pre-requirements. The plugin can then use this information to create a session with the session service and receive an authorization token (e.g., an X-Auth token) in return. In this manner, the resource aggregator 230 and the plugins 243a-n may be completely decoupled and run on different servers if desired and without any need to run them within the same process space.

Depending on the underlying plugin, the resource aggregator 230 could use various means to authenticate itself. Since, in one embodiment, plugins 243a-d are stateless, this can be done using asymmetric public key cryptography where the plugin and the resource aggregator 230 exchange public key information and use it to encrypt the data. Alternatively, in scenarios where the plugin actually works with a stateful resource manager (instead of working directly with of the resource), it could use self-signed certificates to authenticate itself to the resource manager. Further discussion regarding authentication processing is provided below with reference to FIG. 4.

The Event Message Bus (EMB)

Turning now to the EMB 241, in an example, it provides reliable data delivery from the producers (e.g., heterogeneous infrastructure resources 251) to the consumers (e.g., north-bound clients). In this manner, the resource aggregator 230 and the plugin layer 242 need not be concerned about the reliability of message delivery and can focus on implementing their respective features. According to one embodiment, the EMB 241 generally represents a communication channel between the resource aggregator 230 and the plugins 243a-d for event, telemetry and notification data. In one embodiment the EMB 241 supports an initial deployment of a single node broker while allowing for the system to seamlessly scale to multiple nodes as the system increases in complexity and size. In order to support increased throughput requirements for messages, for example, a clustered EMB implementation may be used to provide high availability while also facilitating horizontal scalability of the plugins based on volume while also ensuring message persistence.

In one embodiment, the EMB 241 provides a messaging layer that allows components (e.g., plugins and north-bound clients) developed using various methodologies to communicate using a common messaging architecture without having to be deeply aware of each other's internal implementations. According to one embodiment, the EMB 241 provides a platform for the various entities to engage in a publish/subscribe communication model. For example, publisher and subscriber queues may be implemented to perform operations on the heterogeneous infrastructure resources 251. In an embodiment, the RA 230 includes a single, primary publish queue for all the plugins 243a-d while subscribing to individual queues for each plugin. In this example, all plugins 243a-d would subscribe to the primary publish queue of the RA 230 and would each maintain individual publish queues of their own. The plugin publish queues can also be subscribed to by external entities that rely on data streams. Further discussion regarding resource-aggregator notification processing is provided below with reference to FIG. 5.

In one implementation, existence of the EMB 241 enforces an architectural tenets that plugins generally do not communication with each other directly, but rather, as discussed further below, would reach back to the resource aggregator 230 and operate like a north-bound client if they desire information from another plugin.

As the EMB 241 is expected to be part of an environment that receives a substantial amount of real-time data streamed from a significant number of resources, in one embodiment, the EMB 241 supports streaming of real-time data to the subscribers (e.g., north-bound clients).

In various embodiments, the EMB 241 is secured to ensure that none of the producers and consumers be subject to a Denial of Service (DoS)/Distributed Dos (DDoS) attack by being overwhelmed with messages. For example, the EMB 241 may allow only authorized and authenticated producers and consumers to participate in the communication channel to ensure all the elements in the EMB 241 are trustworthy. The EMB may also define a mechanism for new producers and consumers to easily join and receive notifications as required. In this manner, north-bound consumers (e.g., pod managers, composers, monitoring systems and Artificial Intelligence (AI)/Machine Learning (ML) systems that learn from system data) will be able to securely join the system to receive relevant information. The same mechanism can be extended for any plugin-based communications as well that are sent through the resource aggregator 230.

Figure 3:
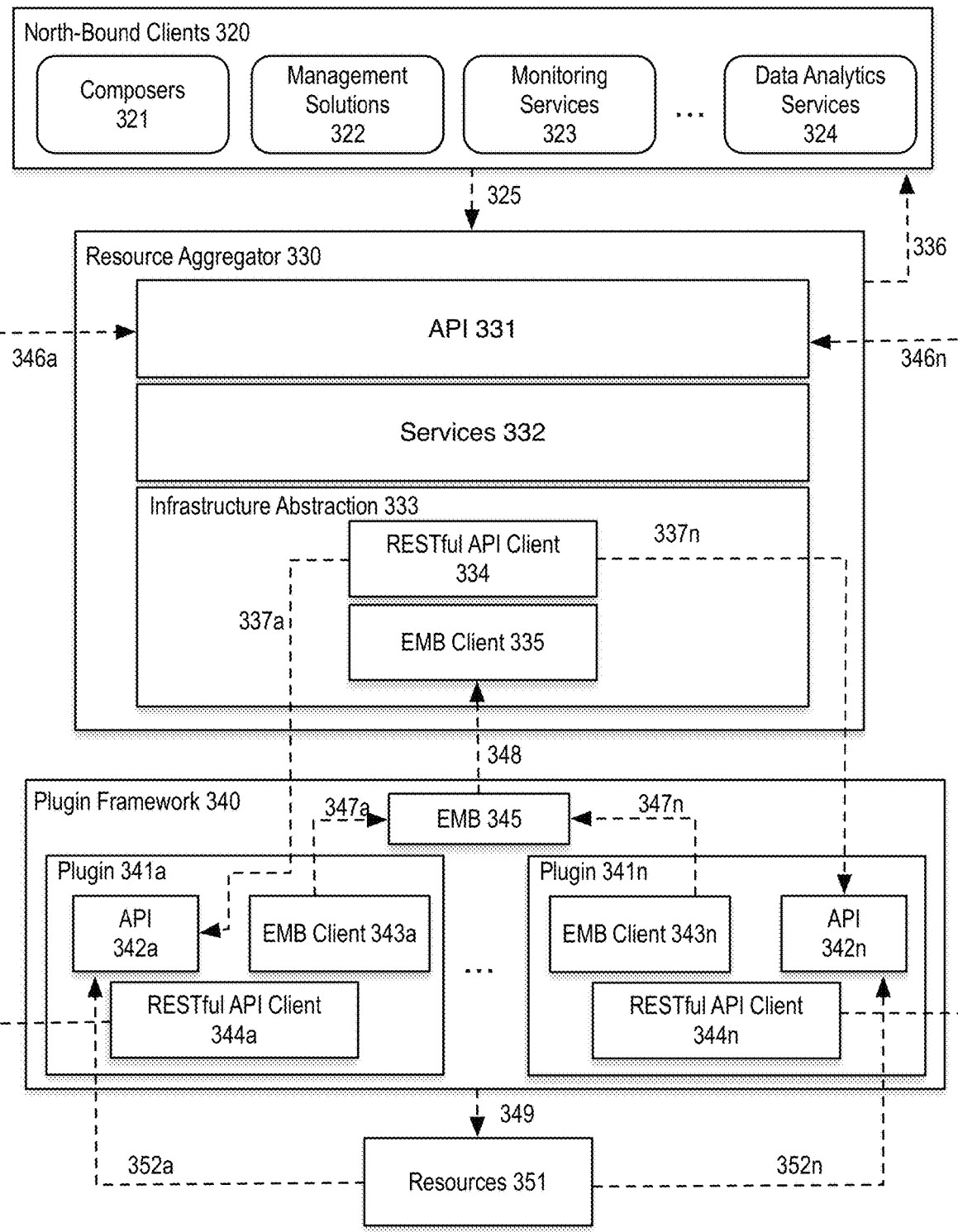
FIG. 3 is a block diagram illustrating a domain model and interactions among various components of a resource aggregator and a plugin framework in accordance with an embodiment.

FIG. 3 is a block diagram illustrating a domain model and interactions among various components of a resource aggregator 330 and a plugin framework 340 in accordance with an embodiment. As noted above, north-bound clients 320 (e.g., composers 321, management solutions 322, monitoring services 323, data analytics services 324, and the like) make use of the resource aggregator 330 (with the assistance of the plugin framework 340) to perform operations (e.g., configuration operations) on resources 351 and receive notifications (e.g., regarding subscriber events) and telemetry data from the resources 351.

In the context of the present example, the resource aggregator 330 includes an API layer 331, a services layer 332 and an infrastructure abstraction layer 333 and the plugin framework includes an event message bus (EMB) 345, which may generally correspond the EMB 241 of FIG. 2, and a plugin layer 242, including multiple plugins 341a-n.

Plugin API Accessibility

According to one embodiment, the plugin layer 242 facilitates performance of a variety of different operations with the primary HTTP operations (i.e., GET, PUT, POST and DELETE). For ease of reference, plugin APIs (e.g., APIs 342a-n) may be made accessible to plugin developers through an API development tool or other framework for describing APIs. For example, detailed return codes, parameters, message body and other API information may be provided via a user interface (UI) (e.g., the Swagger UI).

Depending upon the particular implementation, the plugin layer 242 may be standardized on a well-known data-interchange format. In one embodiment, a lightweight data-interchange format may be used as the data format for communication. A non-limiting example of a suitable lightweight data-interchange format is an object notation representation (e.g., JSON). The API service may make use of Hypermedia As The Engine Of Application State (HATEOAS) principles to link resources using the href key. While in the context of various examples described herein, application/json is the media type for plugin content, those skilled in the art will appreciate a variety of other media types could be used.

For purposes of security, the platform, the API service under the plugin layer 242 may use token-based authentication. For example, this may be applicable to authentication information flowing from the resource aggregator 330 to the plugin 341a-n where the plugin 341a-n is authenticated and also to data flowing from the plugin 341a-n to the resource aggregator 330 where the resource aggregator 330 is authenticated. In some embodiments, the plugins 341a-n may use mutual Secure Sockets Layer (SSL) authentication using self-signed certificates for this purpose.

In some embodiments, data transmitted on the wire may be encrypted, for example, using Transport Layer Security (TLS). While in embodiments described herein, the resource aggregator 330 is the primary entity communicating with the plugins 341a-n, as noted above, a plugin 341a-n might want to communicate with another plugin 341a-n to gather resource information. In the context of the present example, this type of communication 346a-n is driven through Northbound APIs (e.g., API 331) provided by the resource aggregator 330. In such scenarios, the resource aggregator 330 may define a plugin role to set and allow permissions for plugins 341a-n to communicate with other plugins 341a-n.

API operations should generally comply with standard Restful API rules around idempotency and concurrency. APIs may also, in some cases, implement capabilities to utilize sub-resources, filtering, sorting and/or other value additions.

Returning to the resource aggregator 330, the infrastructure abstraction layer 333 interacts with the plugins 341a-n and the EMB 345 implemented within the plugin framework 340. In one embodiment, the API layer 331 and the services layer 332 generally correspond to the API layer 231 and services layer 232, respectively, of FIG. 2. The API layer 331 may represent a public API (e.g., in the form of a Redfish-compliant API) through which the north-bound clients 320 may issue requests 325 containing RA-native messages to perform operations on resources 351 and through which feedback 336 may be received in the form of RA-native responses, for example.

In one embodiment, the infrastructure abstraction layer 333 includes a RESTful API client 334 and an EMB client 335. In the present example, the resource aggregator 330 uses the RESTful API client 334 to route requests received via API 331 to an API 342a-n of an appropriate plugin 341a-n within the plugin framework 340. In accordance with various embodiments, the infrastructure abstraction layer 333 may identify the appropriate plugin 341a-n based on the particular type of infrastructure resource to which the request is directed. The request and/or the control information associated therewith may then be issued or passed along in the form of an API request 337a-n to the API 342a-n of the identified plugin 341a-n that manages the particular type of infrastructure resource. For example, a particular plugin of plugins 341a-n may be used to interact with (e.g., provide configuration operations 349 to and receive events and/or telemetry 352a-n from) resources 351 that implement a particular access protocol (e.g., Redfish, Swordfish and/or NETCONFIG/YANG), that are associated with a particular vendor and/or that represent certain IT functionality (e.g., compute, storage, or network functionality).

For its part, the EMB client 335 may receive subscriber events and/or telemetry data published by EMB clients 343a-n of plugins 341a-n responsive to receipt of events and/or telemetry data 352a-n received from resources 351 via APIs 342a-n.

In the context of the present example, each plugin 341a-n includes an API 342a-n, an EMB client 343a-n and a RESTful API client 344a. In one embodiment, the APIs 342a-n are public APIs (e.g., REST or SOAP-based control APIs) through which corresponding types of resources 351 can be controlled/configured.

Figure 4:
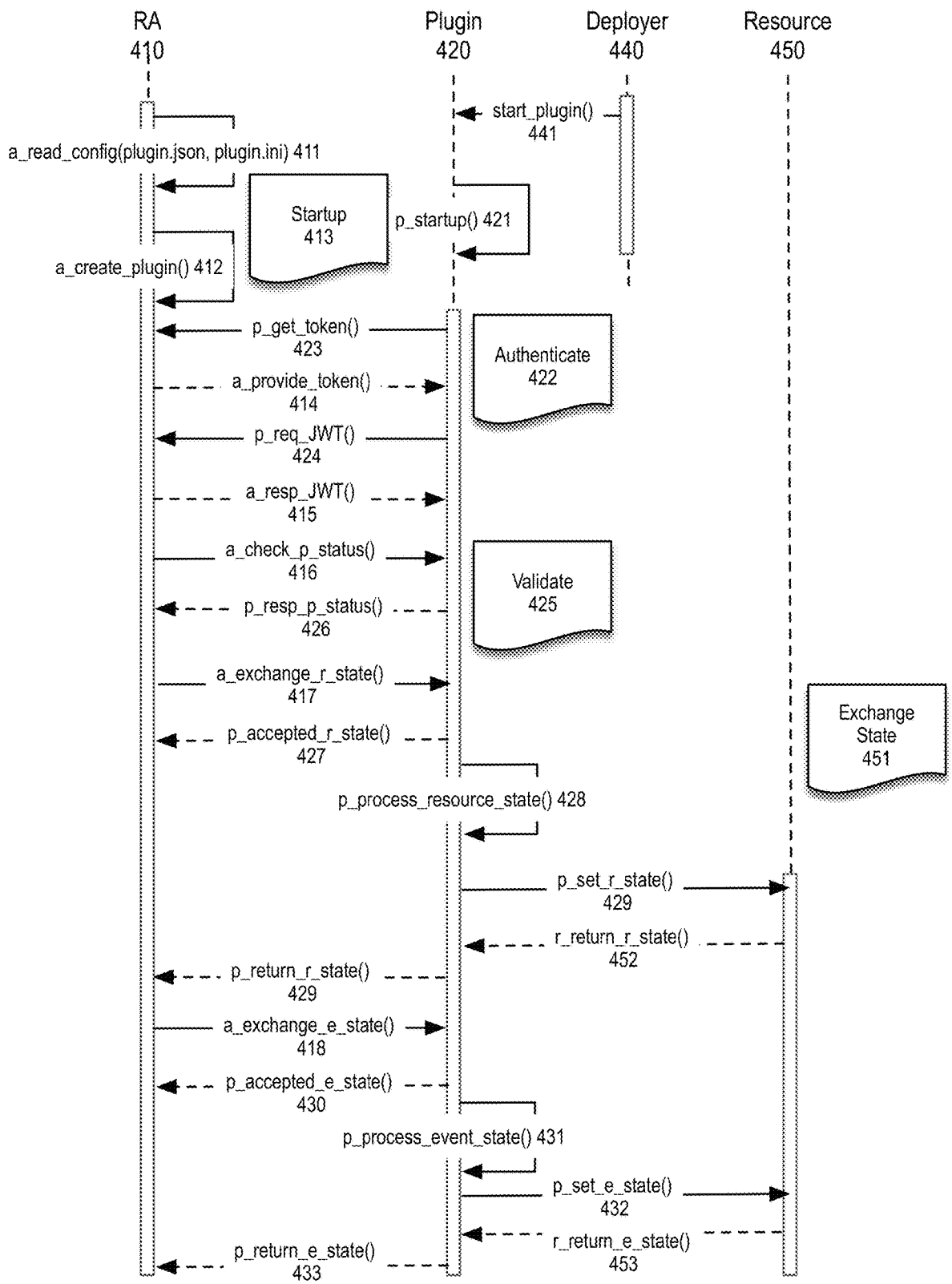
FIG. 4 is a message sequence diagram illustrating plugin startup processing in accordance with an embodiment.

FIG. 4 is a message sequence diagram illustrating plugin startup processing in accordance with an embodiment. In the context of the present example, example interactions among a resource aggregator (RA) 410, a plugin 420, a deployer 440 and a resource 450 are described.

Startup Processing/Plugin Service

According to one embodiment, during startup processing 413 or as part of the overall host start-up process, the RA 410 first reads its configuration file (e.g., via the a_read_config( ) routine 411). For example, the RA 410 may look through a plugin directory (e.g., /etc/plugins/conf.d/) to identify plugin services that are to be created. In one embodiment, services for the plugins identified within the configuration file as having a state of 'enabled' are started and those with a state of 'disabled' are not started. For each of the plugins that are enabled, the RA 410 may create the plugin (e.g., via the a_create-plugin( ) routine 412).

In one embodiment, the plugin service may be in the form of an in-memory process started as a System V service. In one embodiment, the plugin service hosts the API server, event synchronizer, load balancers, worker threads, EMB publishers and subscribers among other entities depending upon the particular implementation. In some embodiments, the plugin service has the capability to schedule individual, short-lived instances that perform specific functionality on behalf of north-bound clients. The plugin service can be hosted centrally and deploy individual instances of worker threads across distributed sites to facilitate scalability of the plugin layer 242.

In some embodiments, the plugin service may be available to run as a Linux systemd service so as to allow the RA 410 to start the plugin service as any system service while also allowing implementations to decouple this relationship and have the plugin service started up and shutdown using the service command. Additionally, this decoupling allows the option of deploying and configuring plugin services using popular configuration managers.

Information on parameters to be passed to the plugin service on start-up may be provided within a plugin configuration file. Additionally, each plugin may individually include a configuration file from which it can read other parameters. In one embodiment, the configuration files are configured as JSON files for the RA 410 to read and take action. In such a scenario, the configuration file for the RA 410 may contain the path to the plugin files, including a master plugin configuration file and individual plugin-specific configuration files.

In one embodiment, the plugin configuration file is a JSON file that both the RA 410 and the plugin 420 can read from. For example, the plugin configuration file may include information regarding the encryption methods to use (e.g., ssh, openssl versions, RSA, key size etc.), what tokens to use (X-Auth, JSON Web Token (JWT), etc.), information for the account service for the plugin user (used for authentication), plugin user types and their corresponding permissions (read-only, read-write, admin etc) as individual objects.

In one embodiment, during startup processing 413, the plugin 420 is directed to start up by deployer 440. For example, the deployer 440 may issue a start_plugin( ) call 441 to the plugin 420. In alternative embodiments, the plugin 420 may be started by the RA 410 or as part of a host startup process. Responsive to receipt of the direction to startup, the plugin 420 initializes itself (e.g., via the p_startup( ) routine 421). For example, the plugin 420 may create artifacts such as a public/private key pair.

Authentication

After the plugin 420 has been initialized an authentication process 422 is performed. According to one embodiment, the RA 410 and the plugin 420 secure the exchange data/ information using Apache Kafka, which has built in security functions. Alternatively, the RA 410 and the plugin 420 may use the JWT standard as part of the authentication process 422. For example, the plugin 420 may request an authorization token (e.g., an X-Auth token) from the RA 410 (e.g., via the p_get_token( ) call 423) by performing a POST to the session service. Responsive to the token request, if the plugin 420 is an authorized plugin, the RA 410 provides the authorization token to the plugin 420 (e.g. via the a_provide_token( ) response 414).

Responsive to receipt of the authorization token by the plugin 420, the plugin 420 sends its public key with to the RA 410 along with the authorization token (e.g., via the p_req_JWT( ) call 424). In response to receipt of the plugin's public key, the RA 410 sends the plugin 420 its public key (e.g., via the a_resp_JWT( ) response 415).

Validation

At this point, validation processing 425 is performed. The RA 410 checks the status of the plugin 420 (via the a_check_p_status( ) call 416) by issuing a GET to obtain the plugin's status. Responsive to the status request, the plugin 420 provides its status to the RA 410 (e.g., via the p_resp_p_status( ) response 426). The RA 410 may verify the response to ensure the plugin 420 is fully started up before proceeding.

Exchange State

After validation processing 425 has been completed, exchange state processing 451 is performed. For example, the plugin 420 processes resource state information and event state information. In one embodiment, this involves the plugin 420 processing resource state the resources being managed by the RA 410 by performing a p_process_resource_state( ) 428 call. In the context of the present example, the plugin 420 sets the state of the resource 450 by making a p_set_r_state( ) call 429 and receives an acknowledgment from the resource 450 in the form of a r_return_r_state( ) 452 response. The plugin 420 then returns the state to the RA 410 via a p_return_r_state( ) call 429. Later on, the RA may decide to change the state of the resource 450, which the plugin 420 receives via an a_exchange_e_state( ) 418 call from the RA 410. The plugin 420 processes the request to change the state via a p_process_event_state( ) 431 routine and sets the state on the resource 450 via a p_set_e_state( ) call 432 to the resource 450. The resource 450 acknowledges the request with a r_return_e_state( ) 453 call, which is passed on to the RA 410 via a p_return_e_state( ) 433 call.

While in the context of the present example, plugins are described as being started up by the RA 410 during its startup processing, in alternative embodiments, when the RA 410 realizes that it will be interacting with a certain device, it may look for the appropriate plugin to use based on values specified in its configuration file. For example, the configuration file may define preferential plugin information that identifies device types and their preferred plugins based on a variety of factors (e.g., server vendor, server family, server generation, etc.). In this scenario, the RA 410 may then invoke the service associated with the plugin(s) which will continue to run through the lifecycle of the plugin until shutdown by the RA 410.

Similarly, in certain cases, if the administrator has specified a plugin as being associated with a particular request and the plugin is not currently running, the RA 410 may start the plugin as a result of the request processing. Additionally, in some embodiments, a Command Line Interface (CLI) or API may be provided to individually start or stop a service.

Figure 5:
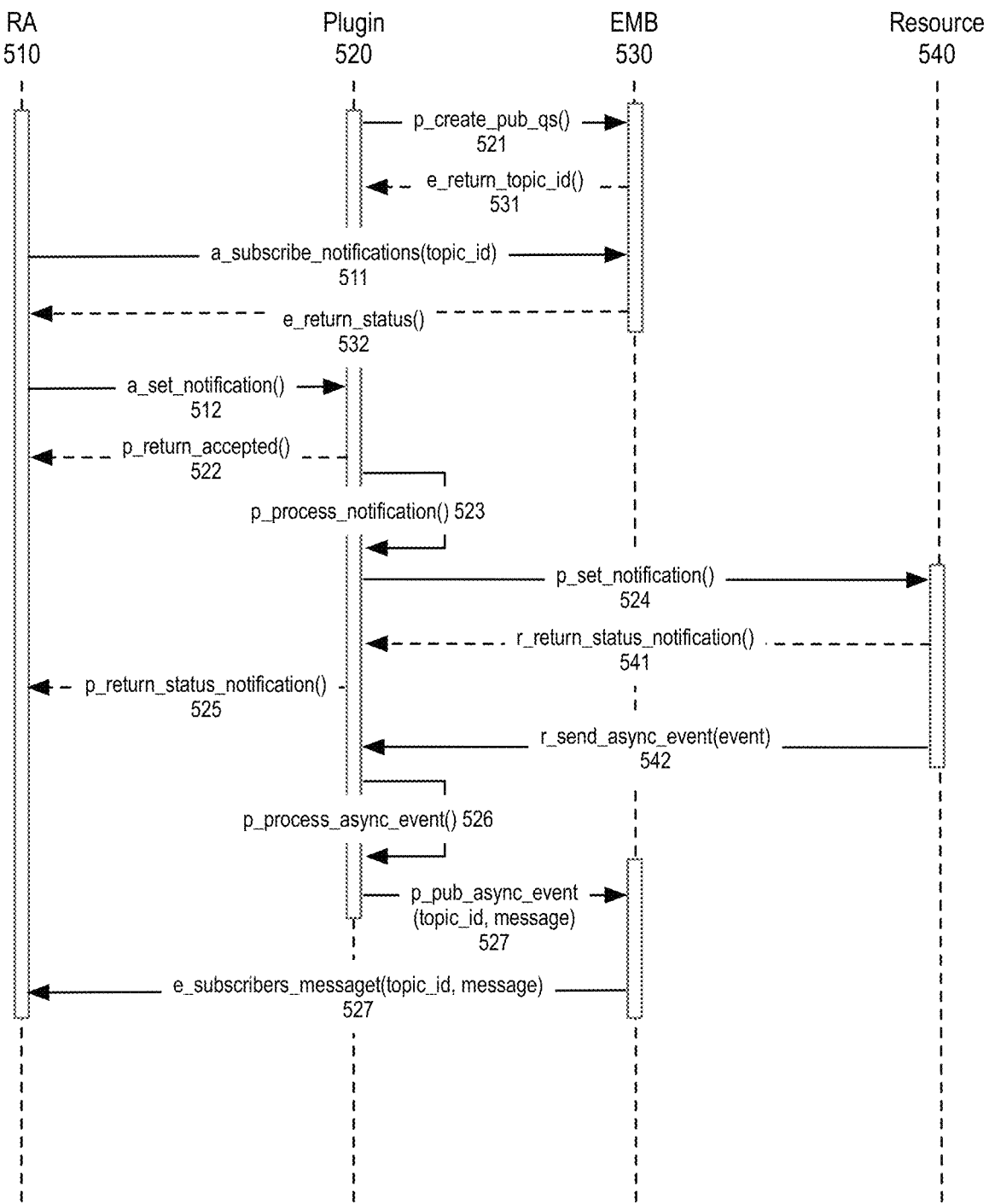
FIG. 5 is a message sequence diagram illustrating resource aggregator-routed notification processing in accordance with an embodiment.

FIG. 5 is a message sequence diagram illustrating resource aggregator-routed notification processing in accordance with an embodiment. In the context of the present example, example interactions among a resource aggregator (RA) 510, a plugin 520, an event message bus (EMB) 530 and a resource 540 are described.

In one embodiment, the plugin 520 may setup various notification response formats, including SNMP, RESTful and message based end-points and may create publish queues with the EMB 530 (e.g., via the p_creat_pub_qs( ) call 521). Responsive to receipt of the request to create publish queues, the EMB 530 return topic IDs to the plugin 520 (e.g., via the e_return_topic_id( ) response 531).

As part of the plugin status response (e.g., the p_resp_p_status( ) response 426 of FIG. 4), the plugin may share publish queue information with the RA 510.

The RA 510 may then subscribe to notifications from the EMB 530 for a particular topic ID (e.g., via the a_subscriber_notifications( ) call 511). Responsive to the subscription request, the EMB 530 acknowledges the subscription (e.g., via the e_return_status( ) response 532).

The RA 510 may then request the plugin 520 to provide it with notifications for the resource 540 by POSTing to plugin's subscription API (e.g., via the a_set_notification( ) call 512) for a subscription. Responsive to the subscription request, the plugin 520 responds with accepted (e.g., via the e_return_status( ) response 532) and processes the notification request (e.g., via a p_process_notification( ) routine 523). The plugin 520, then POSTs a resource-native request to the resource 540 (e.g., via the p_set_notification( ) call 524). The resource 540 acknowledges the request (e.g., via the r_return_status_notification( ) response 541).

Responsive to the response from the resource 540, the plugin 520 returns status to the RA 510 (e.g., via the p_return_status_notification( ) response 525).

Responsive to an asynchronous event, the resource 540 reports the event to the plugin 520 (e.g., via the r_send_async_event( ) call) by responding to a destination Universal Resource Identifier (URI) previously set by the plugin 520. Upon receipt of the event by the plugin 520, the plugin 520 processes the asynchronous event (e.g., via the p_process_async_event( ) routine 526), including converting the resource-native message to a RA-native message (e.g., a Redfish message payload) and publishes the asynchronous event to the EMB 530 (e.g., via the p_pub_async_c_event( ) call 527 to POST to the RA's event service). Alternatively, if the destination URI is an external system, the message would be routed to the external system.

Figure 6:
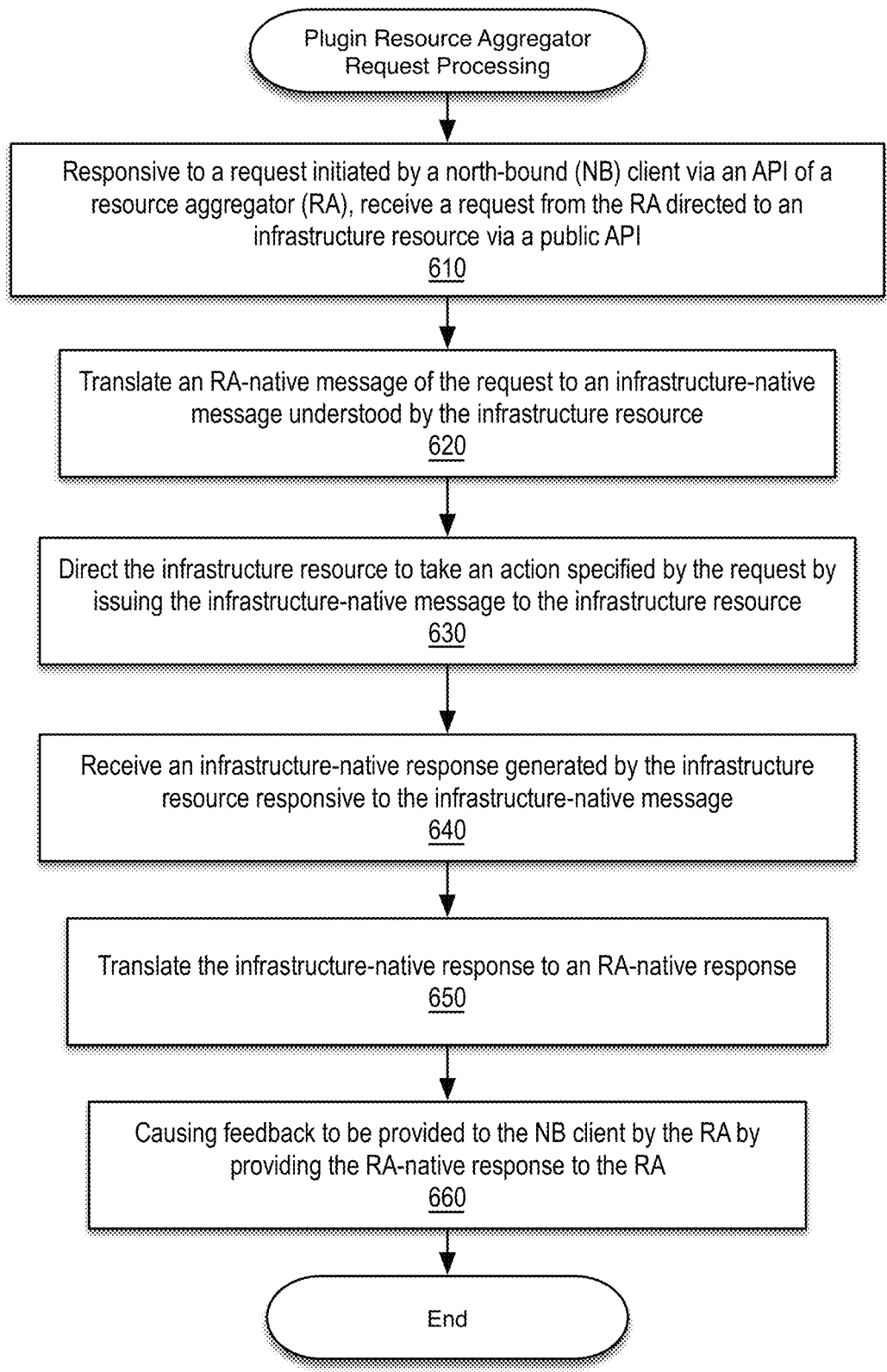
FIG. 6 is a flow diagram illustrating resource aggregator request processing performed by the plugin layer in accordance with an embodiment.

FIG. 6 is a flow diagram illustrating resource aggregator request processing performed by the plugin layer 242 in accordance with an embodiment. The processing described with reference to FIG. 6 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system described with reference to FIG. 7 below.

At block 610, responsive to a request initiated by a north-bound client via an API of a resource aggregator (RA), a plugin receives a request from the RA to an infrastructure resource via a public API of the plugin. In some embodiments, the request initiated by the north-bound client represents an operation to be performed on the infrastructure resource. Non-limiting examples of operations that might be requested by a north-bound client include verifying and upgrading firmware, changing power state, and subscribing to event notifications.

At block 620, the plugin translates an RA-native message of the request to an infrastructure-native message understood by the infrastructure resource. In this manner, the plugin assists the RA in connection with abstracting the complexity of infrastructure management systems communicating directly with heterogeneous hardware elements and their associated vendor-specific fault and configuration management protocols and configuration models. In one embodiment, the RA-native message is a Redfish message payload. In such a scenario, the plugin translates the Redfish message (which may be expressed in JSON) received as a payload to the plugin's API server to a vendor-specific format/protocol for the particular type of the infrastructure resource at issue. Non-limiting example of infrastructure-native messages include those associated with Redfish and Baseboard Management Controller (BMC) specific protocols.

At block 630, the infrastructure resource is directed to take an action specified by the request by issuing the infrastructure-native message to the infrastructure resource.

At block 640, responsive to the infrastructure-native message, an infrastructure-native response generated by the infrastructure resource is received by the plugin. For example, the infrastructure may direct its response to the public API (e.g., API 342*a-n*) of the plugin (e.g., plugin 341*a-n*).

At block 650, the infrastructure-native response is translated by the plugin to an RA-native response.

At block 660, the plugin causes feedback to be provided to the north-bound client via the RA by providing the RA-native responses to the RA. For example, a RESTful API client (e.g., RESTful API client 344*a-n*) of the plugin (e.g., plugin 341*a-n*) may make a call to an API (e.g., API 331) of the resource aggregator (e.g., resource aggregator 330).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 7:
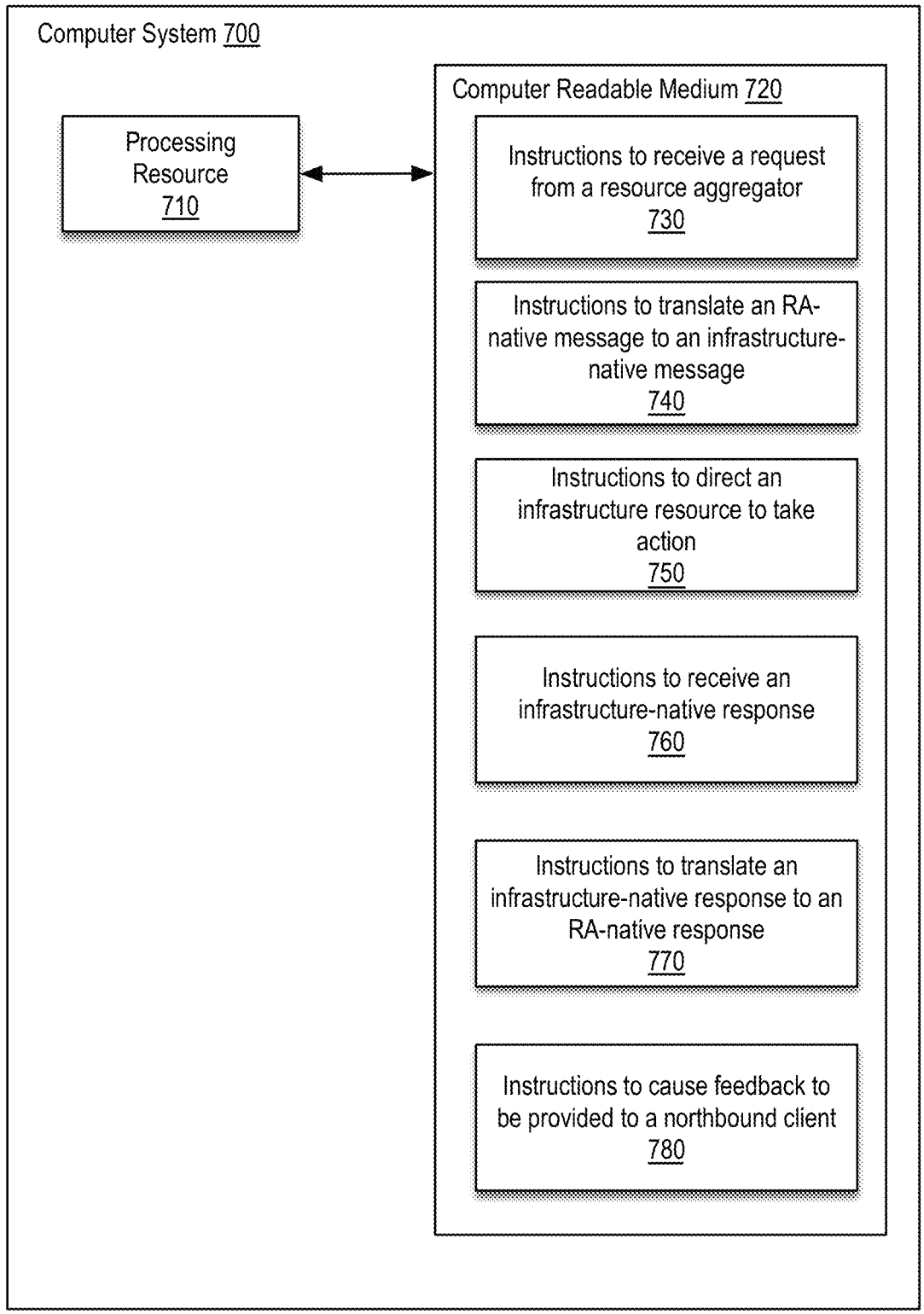
FIG. 7 is a block diagram of a computer system in accordance with an embodiment.

FIG. 7 is a block diagram of a computer system in accordance with an embodiment. In the example illustrated by FIG. 7, computer system 700 includes a processing resource 710 coupled to a non-transitory, machine readable medium 720 encoded with instructions to perform a proactive auto-scaling method in accordance with a private cloud embodiment. The processing resource 710 may include a microcontroller, a microprocessor, central processing unit core(s), an ASIC, an FPGA, and/or other hardware device suitable for retrieval and/or execution of instructions from the machine readable medium 720 to perform the functions related to various examples described herein. Additionally or alternatively, the processing resource 710 may include electronic circuitry for performing the functionality of the instructions described herein.

The machine readable medium 720 may be any medium suitable for storing executable instructions. Non-limiting examples of machine readable medium 720 include RAM, ROM, EEPROM, flash memory, a hard disk drive, an optical disc, or the like. The machine readable medium 720 may be disposed within the computer system 700, as shown in FIG. 7, in which case the executable instructions may be deemed "installed" or "embedded" on the computer system 700. Alternatively, the machine readable medium 720 may be a portable (e.g., external) storage medium, and may be part of an "installation package." The instructions stored on the machine readable medium 720 may be useful for implementing at least part of the methods described herein.

In the context of the present example, the machine readable medium 720 is encoded with a set of executable instructions 730-780. It should be understood that part or all of the executable instructions and/or electronic circuits included within one block may, in alternate implementations, be included in a different block shown in the figures or in a different block not shown.

Instructions 730, upon execution, cause the processing resource 710 to receive a request from a resource aggregator. In one embodiment, instructions 730 may correspond generally to instructions for performing block 610 of FIG. 6.

Instructions 740, upon execution, cause the processing resource 710 to translate an RA-native message to an infrastructure-native message. In one embodiment, instructions 740 may correspond generally to instructions for performing block 620 of FIG. 6.

Instructions 750, upon execution, cause the processing resource 710 to direct an infrastructure resource to take an action. In one embodiment, instructions 750 may correspond generally to instructions for performing block 630 of FIG. 6.

Instructions 760, upon execution, cause the processing resource 710 to receive an infrastructure-native response. In one embodiment, instructions 760 may correspond generally to instructions for performing block 640 of FIG. 6.

Instructions 770, upon execution, cause the processing resource 710 to translate an infrastructure-native response to an RA-native response. In one embodiment, instructions 770 may correspond generally to instructions for performing block 650 of FIG. 6.

Instructions 780, upon execution, cause the processing resource 710 to cause feedback to be provided to a north-bound client. In one embodiment, instructions 780 may correspond generally to instructions for performing block 660 of FIG. 6.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
providing a plugin framework logically interposed between a plurality of resource aggregators (RAs) and a plurality of distributed data centers containing a plurality of heterogeneous infrastructure resources, wherein the plugin framework includes a plurality of plugins each of which exposes a public application programming interface (API) through which the plurality of RAs interact with the plurality of heterogeneous infrastructure resources and wherein each of the plurality of plugins corresponds to a particular type of infrastructure resource of the plurality of heterogeneous infrastructure resources;
responsive to a first request issued to a resource aggregator (RA) of the plurality of RAs by a north-bound client relating to a collection of infrastructure resources of the plurality of heterogeneous infrastructure resources, receiving, via the public API of a plugin of the plurality of plugins, a second request including an RA-native message directed to an infrastructure resource of the collection, wherein the infrastructure resource is of a type corresponding to the plugin, and wherein the first request comprises a management function to be performed on the collection; and
directing, by the plugin, the infrastructure resource to take an action specified by the second request by translating the RA-native message to an infrastructure-native message understood by the infrastructure resource.

2. The method of claim 1, further comprising:
responsive to the infrastructure-native message, receiving, by the plugin, an infrastructure-native response generated by the infrastructure resource; and
providing, by the plugin, feedback to the north-bound client regarding the RA-native message via the RA by translating the infrastructure-native response to an RA-native response.

3. The method of claim 1, further comprising identifying, by the RA, the plugin based on a resource-plugin mapping maintained by the RA.

4. The method of claim 1, wherein the north-bound client comprises a security service, an identity service, a composer, a management solution, a monitoring service or a data analytics service.

5. The method of claim 1, wherein the plurality of heterogeneous infrastructure resources include compute, storage and networking infrastructure resources from different vendors.

6. The method of claim 1, wherein plugin framework includes an Event Message Bus (EMB) that implements a publisher/subscriber communication model through which north-bound clients associated with the RA receive events or notifications from a subset of the plurality of heterogeneous infrastructure resources for which they have subscribed.

7. The method of claim 6, further comprising:
receiving, by the plurality of plugins, real-time streamed telemetry data from the plurality of heterogeneous infrastructure resources; and
causing, by the plurality of plugins, the real-time streamed telemetry data to be delivered to subscribers of the respective real-time streamed telemetry data by publishing the respective real-time streamed telemetry data to respective queues maintained by the plurality of plugins that are accessible to the EMB.

8. The method of claim 1, wherein each of the plurality of plugins implement a plurality of mandatory methods including a method for adding infrastructure and a method for setting a certain type of notification.

9. The method of claim 1, wherein each of the plurality of plugins implement a Representational State Transfer (REST) server and a REST client.

10. The method of claim 1, wherein the public API is an open API that is compliant with the OpenAPI Specification.

11. The method of claim 1, further comprising performing, by the plugin framework, autodiscovery of a new infrastructure resource added to a data center of the plurality of distributed data centers based on a native protocol used by the new infrastructure resource.

12. The method of claim 1, wherein the management function comprises a fault management function or an infrastructure lifecycle management function.

13. A non-transitory machine readable medium storing instructions executable by a processing resource of a computer system, the non-transitory machine readable medium comprising instructions to:
provide a plugin framework logically interposed between a plurality of resource aggregators (RAs) and a plurality of distributed data centers containing a plurality of heterogeneous infrastructure resources, wherein the plugin framework includes a plurality of plugins each of which exposes a public application programming interface (API) through which the plurality of RAs interact with the plurality of heterogeneous infrastructure resources and wherein each of the plurality of plugins corresponds to a particular type of infrastructure resource of the plurality of heterogeneous infrastructure resources;
responsive to a first request issued to a resource aggregator (RA) of the plurality of RAs by a north-bound client relating to a collection of infrastructure resources of the plurality of heterogeneous infrastructure resources, receive, via the public API of a plugin of a plurality of plugins, a second request including an RA-native message directed to an infrastructure resource of the collection, wherein the infrastructure resource is of a type corresponding to the plugin, and wherein the first request comprises a management function to be performed on the collection; and
direct, by the plugin, the infrastructure resource to take an action specified by the second request by translating the RA-native message to an infrastructure-native message understood by the infrastructure resource.

14. The non-transitory machine readable medium of claim 13, wherein the method further comprises:
responsive to the infrastructure-native message, receiving, by the plugin, an infrastructure-native response generated by the infrastructure resource; and
providing, by the plugin, feedback to the north-bound client regarding the RA-native message via the RA by translating the infrastructure-native response to an RA-native response.

15. The non-transitory machine readable medium of claim 13, wherein the plurality of heterogeneous infrastructure resources include compute, storage and networking infrastructure resources from different vendors.

16. The non-transitory machine readable medium of claim 13, wherein plugin framework includes an Event Message Bus (EMB) that implements a publisher/subscriber communication model through which north-bound clients associated with the RA receive events or notifications from a subset of the plurality of heterogeneous infrastructure resources for which they have subscribed.

17. The non-transitory machine readable medium of claim 16, wherein the method further comprises:
receiving, by the plurality of plugins, real-time streamed telemetry data from the plurality of heterogeneous infrastructure resources; and
causing, by the plurality of plugins, the real-time streamed telemetry data to be delivered to subscribers of the respective real-time streamed telemetry data by publishing the respective real-time streamed telemetry data to respective queues maintained by the plurality of plugins that are accessible to the EMB.

18. The non-transitory machine readable medium of claim 13, wherein the public API is an open API that is compliant with the OpenAPI Specification.

19. The non-transitory machine readable medium of claim 13, wherein the method further comprises performing, by the plugin framework, autodiscovery of a new infrastructure resource added to a data center of the plurality of distributed data centers based on a native protocol used by the new infrastructure resource.

20. The non-transitory machine readable medium of claim 13, wherein the management function comprises a fault management function or an infrastructure lifecycle management function.

* * * * *